Nov. 26, 1929.    G. R. BAKER ET AL    1,737,349
DOUGH SHEETING MACHINE AND THE LIKE
Filed May 29, 1928    3 Sheets-Sheet 1

INVENTORS
George R. Baker & John C. Paterson
By Marks & Clerk
Attys.

Nov. 26, 1929.  G. R. BAKER ET AL  1,737,349
DOUGH SHEETING MACHINE AND THE LIKE
Filed May 29, 1928  3 Sheets-Sheet 2

INVENTORS
George R. Baker & John C. Paterson
By Marks & Clerk
attys.

INVENTORS
George R. Baker & John C. Paterson

Patented Nov. 26, 1929

1,737,349

UNITED STATES PATENT OFFICE

GEORGE RALPH BAKER AND JOHN CURRIE PATERSON, OF WILLESDEN, LONDON, ENGLAND, ASSIGNORS TO BAKER PERKINS COMPANY, INC., OF SAGINAW, MICHIGAN

DOUGH-SHEETING MACHINE AND THE LIKE

Application filed May 29, 1928, Serial No. 281,543, and in Great Britain July 5, 1927.

This invention relates to dough sheeting machines and the like or machinery employing rollers between which the dough is fed to dies or forming plates, or means adapted to deliver the dough in a continuous sheet or in ribbons.

An object of the present invention is to provide an improved method of and means for controlling the feeding pressure at which the dough is delivered to the dies or like means while at the same time reducing to a minimum unprofitable resistance to the passage of the dough.

A further aim of the invention lies in the provision of means adapted to afford a control of the thickness of the delivery sheet or ribbons independently of the setting of the rollers.

Another object of the invention is to provide a standard machine which is adapted to treat dough of a wide range of consistencies.

The invention in one of its aspects is based upon the observation that the distance between the line of minimum space between the rollers and the dies should be as small as possible and according to the invention a die or sheet-forming means is introduced between the minimum space line referred to above and a straight line drawn at a tangent to the lower surface of the rollers.

The invention also consists in the provision of a pair of members constituting a die or sheet-forming means constructed and arranged to afford adjustable spacing relationship to control the thickness of the dough passing therethrough.

A further feature of the invention lies in the combination of die or sheet-forming means with scrapers or dough-stripping devices adapted to operate in association with the roller surfaces.

Figure 1:
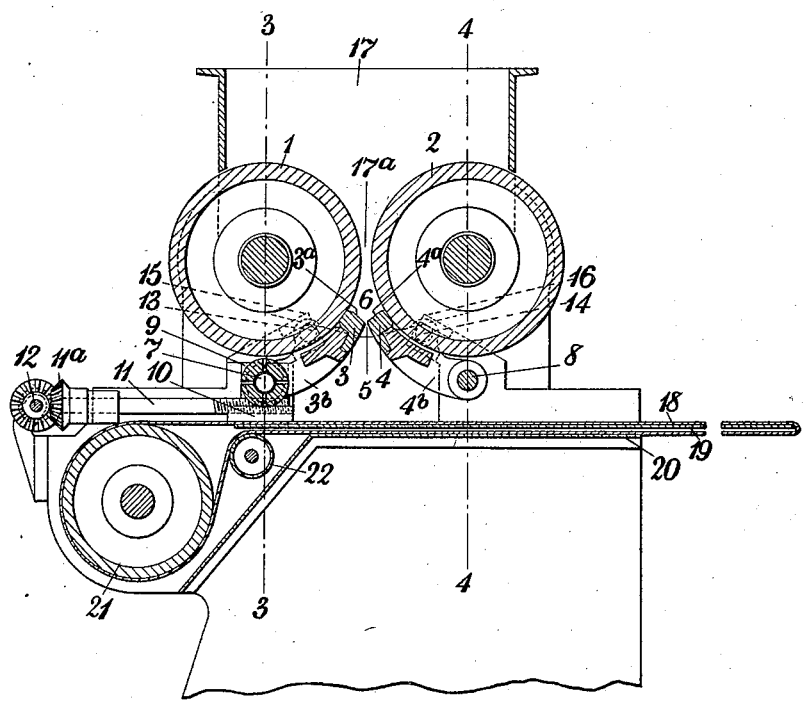
Figure 1 is a diagrammatic sectional view of part of a dough sheeting machine constructed according to the invention.
Figure 2:
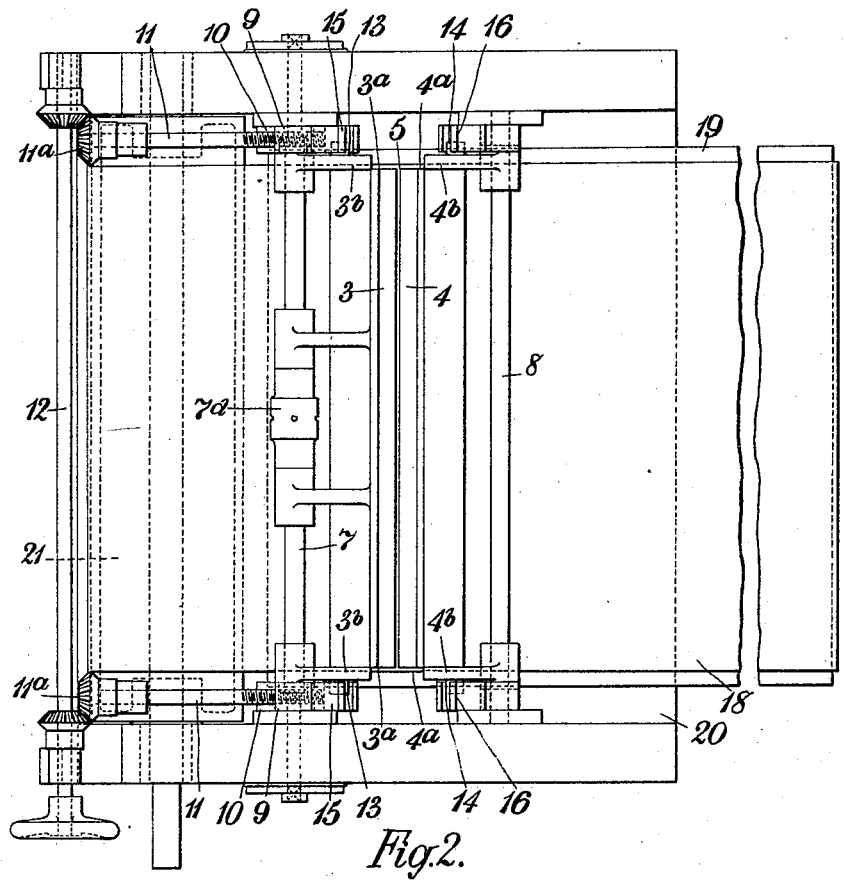
Figure 2 is a plan view from which the dough feeding rollers have been removed for the sake of clearness.
Figure 3:
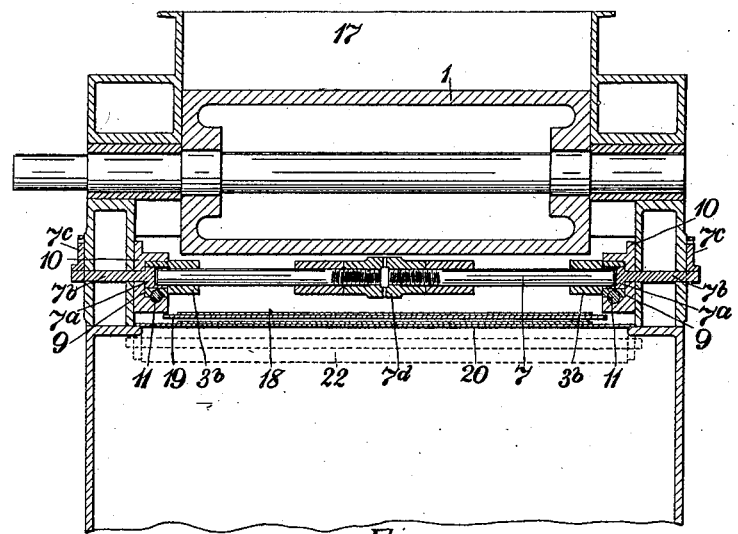
Figure 4:
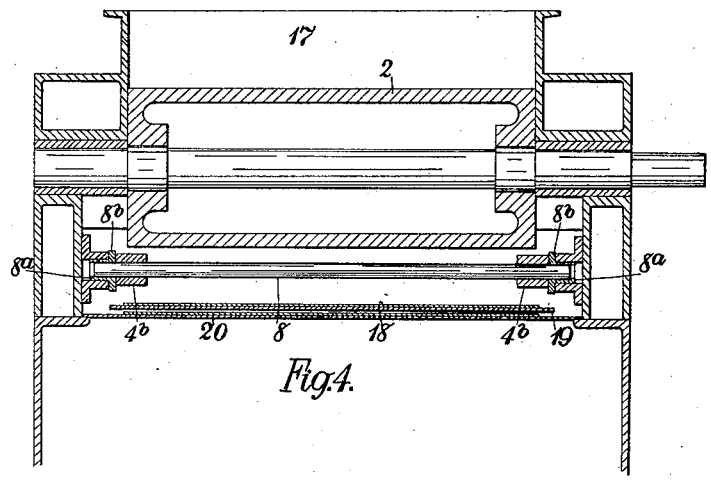

Figures 3 and 4 are, respectively, sections taken on the lines 3—3 and 4—4 of Figure 1.

In carrying the invention into effect according to one convenient mode by way of example, the usual dough sheeting rollers 1 and 2 are provided, the surface of which may be formed with buttress teeth (not shown) or otherwise configurated in a manner suitably to grip or act upon the dough.

The spacing relationship of the rollers may be adjustable but for the purpose of the invention there is no reason why they should be other than fixed. Below the line of minimum distance between the roller surfaces (or in other words below the plane passing through the axes of the rollers) and above a plane tangent to the under surface of both rollers, is located a pair of die plates or transverse members 3 and 4. These die plates may, if desired, be curved at the part 5 adjacent the minimum clearance where they are adapted to act upon the dough. The plates are adapted to be arranged one on either side of the central (vertical) plane passing between the surfaces of rollers 1 and 2, and the facing areas of the plates may be given any desired configuration in order to produce either sheets or ribbons of dough with or without subsidiary mouldings thereon. If desired, one plate may be plain while the other plate may be recessed or otherwise shaped to produce the desired moulding operation.

It is preferred that each plate be formed in one with or be located in contiguous association with a scraper or dough-stripping device adapted to co-operate with the roller surfaces and direct the dough inwardly. The die members and the scrapers are conveniently formed integrally as transverse angle plates or irons after the manner shown in Figure 1, the exterior edge being arcuate as at 5 to form the die surfaces adapted to act upon the dough. The scraper portion of the plates is seen in Figure 1 at $3^a$ and $4^a$ adjacent the surface of the rollers 1 and 2, respectively. The general angle embraced by the outer surface of the plates on the inward side may be not less than 90° or another suitable angle may be adopted. The disposition of the plates 3 and 4 and their general arrangement should be such that the dies and scrapers form the lower boundary to a compression space or chamber 6 into which the dough is passed by the rollers, this chamber being, in the region of the scrapers or just above the dies, somewhat wider than the minimum space between the rollers so that in working two relatively small pockets of dough lie on either side of the central transverse plane. In disposing the die plates in their relationship to the minimum space between the rollers, allowance should be made for the provision of sufficient roller contact surface to be exposed to the dough in order that adequate force or feeding movement can be imparted to the dough on its way to the dies.

According to the preferred method of mounting, the die plates are carried upon brackets or arms $3^b$ and $4^b$ which are pivoted below the axes of the rollers upon transverse shafts 7 and 8. Both these shafts may be displaceably mounted such as by positioning them in sliding blocks or members adapted to be displaced horizontally towards and away from the vertical central plane. However, for practical purposes it has been found the results acquired can be achieved by making one only of the dies adjustable in this sense. According to the present form the shaft 8 is supported in a fixed position in the side frames of the machine and the shaft 7 is mounted in blocks 9 adapted to slide in guideways 10. Rotatable shafts 11 which have screw threaded engagement with the blocks and bearings in the guideways, are adapted to cause the displacement of the blocks 9 and consequently the die plate 3. The shafts 11 may have bevel gears $11^a$ in mesh with corresponding gears on a common handwheel-operated shaft 12. The arms or supports or the die plates are provided with means additional to their pivots, for guiding them in the displacement movements as for maintaining the die scrapers in proper position. For example, the lever arms $3^b$, $4^b$ may be provided with lateral pins 13, 14 adapted to engage between a pair of guide surfaces or slideways 15, 16 carried by the frame or convenient fixed part.

In some circumstances it may be found desirable to provide adjustment for the scrapers and/or for the angular relationship of the die plates, in which case the dies and scrapers may be mounted separately, or the die scrapers may be together pivoted so that they are capable of being tilted to vary the scraper angle.

In order to provide adjustment for the scrapers with respect to the rollers the disposition of the pivots for the arms $3^b$, $4^b$ may be variable transverse to the plane of displacement for adjusting the die width. For example the shafts 7 and 8 may be mounted in eccentrics capable of rotational adjustment. According to the present form the ends of the shaft 8 may be mounted in eccentric sleeves $8^a$ which may be rotated by the aid of nut formations thereon, such as at $8^b$. The ends of the shaft 7 may be supported in eccentric cup members $7^a$ each of which has a spindle $7^b$ extending through the frame. On the outer end of the spindles $7^b$ segmental plates or arms $7^c$ may be provided and may have apertures therein for the reception of locating pins. If desired, the shaft 7 may be divided into two, united by a turnbuckle $7^d$ for enabling the withdrawal of the spindle from the eccentric cups to permit removal of the die plate mounting.

The dough may be fed to the rolls from a hopper 17 which may have extensions or communicate with parts $17^a$ adapted to lie at either end of the rollers to form end closures for the space 6. The dough may be delivered upon a table according to any of the known methods it being preferred, however, to deliver it upon a travelling band or conveyor 18 which is lapped around a table plate 19 and over an apron or surface sheet 20 extending between the frames. The conveyor 18 may be driven by a roller 21 and guided by a small roller 22.

The driving means for the rolls 1 and 2 and various other parts of the machine have been omitted for sake of clearness and it is to be understood that any suitable power transmitting mechanism or gears may be employed for the various purposes.

Further it is to be understood that although specific means have been described for positioning the die plates and scrapers the invention is not confined in this respect; any suitable means may be provided for supporting the die plates and providing for the required adjustments. The die plates may be interchangeably mounted or may be themselves adapted to receive interchangeable facing plates or members for impressing upon the dough various shapes or configurations.

In operation the dough placed in the hopper 17 is forced down by the rollers 1 and 2 into the space 6 and the rotative action of the rollers creates a pressure in this space which causes the extrusion of the dough in sheet or other equivalent form through the dies and between the edges 5 of the plates. The sheet or other forms taken by the extruded dough passes on to the conveyor 18 and is fed away from the position of the dies. The scrapers serve to prevent any dough being carried round upon the surface of the rollers away from the pocket 6.

When it is desired to alter the thickness of the dough sheet the handwheel on the shaft 12 is operated to cause the plate 3 to approach or recede from the plate 4. If this movement alters the adjustment of the scraper $3^a$ it may be re-adjusted by aid of the eccentric cup arrangement $7^a$.

It will be appreciated that according to this invention various consistencies of dough may be treated and a standard machine may be built with rollers having a fixed spacing relation the one to the other, which is adapted to treat dough of a wide range of consistencies without requiring adjustment as to the spacing relationship of the dough feeding rollers.

Having now described our invention, what we claim as new and desire to secure by Letters Patent is:—

1. A dough sheeting machine or the like comprising a pair of feeding rollers between which dough is fed, and a die device having associated scraper elements and a die located between the plane of the axes of the rollers and the plane tangential to the lower surface of the rollers and positioned to form with the rollers a compression chamber into which the dough is forced by the rollers for extrusion through the die.

2. A dough sheeting machine or the like comprising a pair of feeding rollers between which dough is fed, and a die device having associated scraper elements and a die (adjustable as to width of opening) located between the plane of the axes of the rollers and the plane tangential to the lower surface of the rollers and positioned to form with the rollers a compression chamber into which the dough is forced by the rollers for extrusion through the die.

3. A dough sheeting machine or the like comprising a pair of feeding rollers between which dough is fed and a die device located between the plane of the axes of the rollers and the plane tangential to the lower surface of the rollers and positioned to form with the rollers a compression chamber into which the dough is forced by the rollers for extrusion through the die, said die comprising a pair of independent die plates adjustable toward one another to vary the die opening.

4. A dough sheeting machine or the like comprising a pair of feeding rollers between which dough is fed, and a die device located between the plane of the axes of the rollers and the plane tangential to the lower surface of the rollers and positioned to form with the rollers a compression chamber into which the dough is forced by the rollers for extrusion through the die, said die comprising a pair of independent die plates each secured upon pivotally mounted arms and means for displacing a pivot for adjusting the die opening.

5. A dough sheeting machine or the like comprising a pair of feeding rollers between which dough is fed, and a die device having associated scraper elements (adjustable with respect to the surfaces of said rollers) and a die located between the plane of the axes of the rollers and the plane tangential to the lower surface of the rollers and positioned to form with the rollers a compression chamber into which the dough is forced by the rollers for extrusion through the die.

6. A dough sheeting machine or the like, as claimed in claim 4 wherein the arms are provided with laterally extending pins engaging slideways whereby horizontal displacement of the arm-supports will rock the arms and adjust the scrapers relatively to the rollers.

7. A dough sheeting machine or the like, as claimed in claim 3, wherein the dies and scrapers are formed as integral members which are interchangeably mounted upon the arms.

8. A dough sheeting machine or the like, as claimed in claim 4, wherein the arms are mounted upon a two-part pivot shaft, the parts of which are connected by a turn buckle.

9. A dough sheeting machine or the like as claimed in claim 4 wherein the arms are mounted upon shafts carried in rotatable eccentric members for adjusting the position of the pivotal axis of the arms transverse to the plane of displacement for adjusting the die width.

In testimony whereof we have signed our names to this specification.

GEORGE RALPH BAKER.
JOHN CURRIE PATERSON.